Patented June 6, 1950

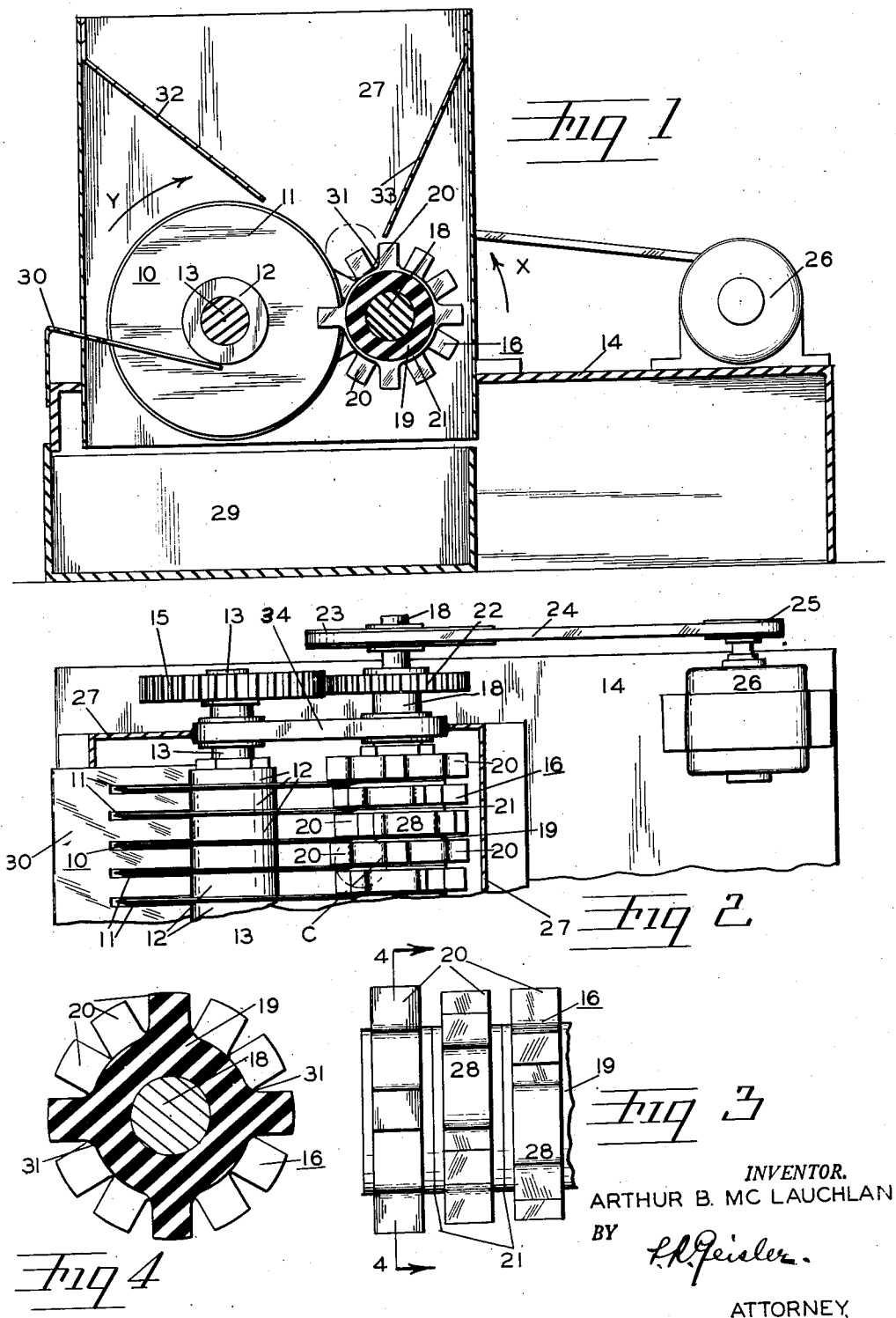

2,510,291

UNITED STATES PATENT OFFICE 2,510,291

FOOD SLICER

Arthur B. McLauchlan, Salem, Oreg.

Application December 26, 1947, Serial No. 793,876

1 Claim. (Cl. 146—98)

This invention relates in general to the slicing of small fruits and berries, especially cherries, strawberries, frozen berries, and the like; and relates in particular to the slicing of so-called "maraschino cherries" used for the preparation of fruit cocktail mixtures, ice-cream and other fruit products. This invention also relates to the slicing of mushrooms.

One of the problems encountered, particularly in the slicing of cherries, is due to the fact that the skin of a cherry is considerably tougher than the meat of the fruit and that pieces of small skin at the bottom of the slices often remain unsevered when the slicing is done by some of the machines now in common use. Even a very small section of uncut skin is sufficient to keep the cherry slices from separating when they are subsequently passed through a mixture of other fruit or food products.

Another difficulty in cherry slicing is caused by the fact that cherry pits are occasionally inadvertently left in the cherries with the result that knives of the slicer are either injured by encounter with the hard pits, or, if the slicer is strong enough to break the pits, the small pieces into which the pits are broken are even more objectionable in the subsequent food product, than the whole pits, and their removal is practically impossible.

While these difficulties are common problems in the slicing of cherries by mechanical slicers they are also encountered to some extent in the slicing of mushrooms, strawberries and frozen berries. In the slicing of any of these food products, if the slicer knives fail to slice entirely through or beyond the mushroom or berry, a very small unsevered portion may be sufficient to hold the slices together. If a piece of gravel inadvertently becomes mixed with the mushrooms or berries and is not removed by ordinary washing, the same result as with cherry pits occurs and the striking of a slicer knife against the piece of gravel, in mechanical slicers now used, will either cause injury to the knife blade or will result in the piece of gravel being broken into small gritty particles, the subsequent removal of which becomes practically impossible.

One of the objects of the present invention is to provide an improved mechanical slicer for cherries, strawberries, frozen berries, mushrooms and other food products in which the complete severing of every slice will be definitely assured.

Another object of this invention is to provide a slicer in which the presence of cherry pits or hard foreign particles will not result in any damage to the slicer knives and also will not result in such objects being broken into undesirable tiny pieces.

A further object of this invention is to provide an improved food slicer which will be simple and practical in construction and which will be capable of efficient and maximum operation with minimum care and upkeep.

These objects and other advantages I attain by constructing my slicer as hereinafter previously described with reference to the accompanying drawings.

In the drawings:

Fig. 1 is a sectional elevation of my slicer;

Fig. 2 is a fragmentary plan view of the same with the hopper omitted for the sake of clarity;

Fig. 3 is a fragmentary plan view of the feeder bar alone, drawn to a larger scale; and Fig. 4 is a transverse section of the feeder bar, corresponding to line 4—4 of Fig. 3.

A rotating slicing knife assembly designated as a whole by the reference character 10, comprises a plurality of identical disc knives 11, separated by disc spacers 12 of much smaller diameter, and all keyed or otherwise secured to a horizontal shaft 13. The shaft 13 is rotatably mounted near each end in suitable bearings, one of which is indicated at 34 in Fig. 2, and these bearings are provided on the supporting frame 14 of the entire machine. A gear 15 is secured to one end of the shaft 13 for rotating the shaft 13 and therewith the entire slicing knife assembly 10 as later explained.

A rotating feeder assembly or feeder bar, designated as a whole by the reference character 16, consists of a thick roller 19 of rubber or similar resilient material secured to a horizontal supporting shaft 18. This rubber roller 19 has radially extending rubber knobs 20, all of which are identical and which are formed in spaced series. In the embodiment of my invention illustrated in the accompanying drawings there are four knobs 20 in each series, these four knobs being located in the same vertical plane and extending approximately at right angles with respect to each other. Each of these series of four knobs is separated from the next series by an annular space or slot of approximately the same width as the thickness of the slicing knives 11. In Fig. 3 the width of these annular spaces has been exaggerated for the sake of clarity. The knobs in the consecutive series may be arranged in rows parallel to the shaft 18, but preferably are staggered as indicated in the drawings, following either a spiral formation or herringbone formation throughout the length of the roller 19. In the annular spaces or slots between the series of knobs 20 annular slits 21 are made in the surface of the rubber roller 19 and the beveled sharpened perimeters or cutting edges of the circular knives 11 extend into these slits 21 but do not extend entirely to the bottom of the slits. The side faces of the knobs 20 are parallel to the vertical planes of rotation of the knives 11. The forward faces of these knobs 20, in the direction of rotation of the feeder assembly, are formed with concave surfaces 31 at their bases which merge into the cylindrical surface of the rubber roller 19 as shown most clearly in Fig. 4.

A gear 22, keyed on the shaft 18, meshes with the gear 15 (Fig. 2). A pulley 23 on the end of shaft 18 is connected by a V-belt to a pulley 25 driven by a motor 26. Thus, rotation of the pulley 23, in the direction indicated by arrow X in Fig. 1, causes the feeder assembly 16 to rotate in the same direction and causes the slicing knife assembly 10 to rotate in the opposite direction, this latter direction being indicated by the arrow Y in Fig. 1. The diameters of the meshing gears 15 and 22 are of such relative size that the peripheral speed of the knives 11 will be substantially equal to the rotational speed of the knobs 20. The diameters of the meshing gears 15 and 22 consequently are made approximately equal to the diameters of the rotating knife assembly and the rotating feeder assembly respectively.

A hopper 27, mounted above the assemblies 10 and 16, has inwardly and downwardly sloping plates 32 and 33 which direct the cherries, strawberries, mushrooms or other food articles, when deposited in the hopper, onto the rotating assemblies as illustrated in Fig. 1.

In the particular embodiment of my invention which I have illustrated the rotating feeder assembly 16 is considerably smaller in diameter than the rotating knife assembly 10. Due to the fact that the rotating feeder is of such relatively small diameter the four resilient rubber knobs 20 in each of the series of knobs on the rubber roller 19, extending approximately at right angles to each other, provide intervening spaces 28 (Fig. 3) which are slightly greater than the largest dimension of cherries, strawberries or other food articles to be sliced. However, if desired, the rotating feeder assembly could be made larger in diameter, and in such case more than four rubber knobs 20 should be provided in each of the series so that the spacing between the individual knobs in each series would not be too great in comparison with the size of the food articles to be sliced. For most efficient performance and production it is desirable that only one food article at a time be positioned between a pair of knobs of a series. The proper spacing of these resilient rubber knobs 20, in each series is an important feature in my invention. Assuming that a cherry, as indicated at C in Figure 2, is to be sliced in my machine, this spacing of the knobs 20 in each series results in the cherry being held within narrow limits as it is pushed against and past the slicing knives. This enables the feeder assembly 16 to be rotated at quite rapid speed without causing any bouncing about or squeezing of the cherries or other articles being sliced.

Although it is not necessary that the knobs 20 in the consecutive series be staggered as shown in Figs. 2 and 3, and my slicer will in fact work satisfactorily if these knobs in the consecutive series extend in rows which are parallel to the axis of rotation of the entire assembly, nevertheless the staggering of the knobs, as illustrated, and their arrangement in either spiral or herringbone formation, provides a smoother and more continuous operation, and thus I prefer to stagger the knobs.

Since the perimeters or cutting edges of the knives 11 not only contact the rubber roller 19 between the series of knobs 20 but also pass beyond the outer surface of the roller and into the slits 21, any possibility that each slice will not be completely severed is eliminated. This is an important feature of my invention. Even with considerable wear of the knives in my slicer the complete severance through the outer tough skin of cherries is assured.

Should a cherry pit or other foreign particle be encountered by one of the slicing knives, the resiliency of the adjacent knob 20 will permit such pit or foreign particle to squeeze past the the knife without causing any injury to the knife and without resulting in the breaking up of the pit or foreign particle to more objectionable smaller bits.

I have found that it is quite essential to have the knives 11 and the knobs 20 travelling at approximately the same rate of speed as they move together. If the knives travel at considerably faster speed than the knobs the slippage of the blades past the knobs produces a "scouring" action, which, I have found, to some extent has a detrimental effect on the slices, especially when soft juicy cherries and fresh and frozen strawberries are being sliced. On the other hand if the speed of the knives is appreciably less than that of the knobs as they pass each other, this also has a detrimental effect and exerts a squeezing action on the fruit against the knives.

Another important factor in the obtaining of perfect slices of cherries and strawberries with my device is the particular shape or formation of the forward face of each knob 20 by which the food article is engaged as it is moved against and past the slicing blades. The concave surface portion 31 (Fig. 4) at the bottom of the forward face of each knob conforms more or less to the rounded surface of the cherry or strawberry and thus provides more support against the crushing or squeezing of a soft juicy food article than would be the case if this engaging face of the knob rose abruptly from the roller surface and left a sharp corner into which part of the food article could be squeezed.

Below the two assemblies 10 and 16, a removable container 29, or other suitable means is provided for the collection and removal of the food slices as these drop down between the two assemblies. In order to prevent any of the slices from sticking to the knife blades and thus being carried around again by the knife assembly I provide a comb-shaped guard or series of scraper blades 30 adjacent the knives on the outer side of the slicing knife assembly.

Minor modifications could be made in the construction of the parts of my device without departing from the principle of my invention. For example, the rotating feeder assembly 16, instead of consisting of an integral rubber roller mounted on the shaft 18, could comprise a plurality of thick rubber disks having knobs extending from their perimeters, the knobs being of slightly less thickness than the disks and the disks cemented to the inner shaft and to each other. This method of forming the feeder is preferable if a larger diameter feeder bar with more than 4 knobs in each series is desired.

However, I have found that when the feeder bar is formed as illustrated in the drawings it can easily be made by molding a single integral hollow roller. It is essential, in any event that the knobs 20 be sufficiently soft and resilient so that they will permit the passage of cherry pits and other foreign particles as mentioned, and that the cutting edges of the knives extend into the outer surface of the feeder bar, for the reasons stated.

I claim:

A food slicer of the character described, for cherries and the like, comprising a rotating knife assembly and a rotating feeder assembly having substantially parallel axes and rotated towards each other at substantially equal peripheral speeds, a plurality of circular disk knives on said knife assembly spaced equal distances apart, the periphery of each disk knife sharpened into a knife-like edge, a plurality of knobs of resilient material extending radially from said feeder assembly and arranged in circular rows spaced axially along said feeder assembly, the spacing between each pair of rows corresponding to the thickness of said disk knives, whereby the lateral faces of said disk knives and said knobs will have rubbing contact, the knobs in each circular row being spaced from each other, a resilient rubber-like surfacing on said feeder assembly between said circular rows of said knobs, an annular slit in said surfacing positioned substantially midway between each pair of said circular rows, and the axes of said knife assembly and said feeder assembly so positioned with respect to each other that the sharpened peripheries of said disk knives will always extend into said slits, and the side faces of said sharpened peripheries will bear against the walls of the slits, whereby, when said slicer is used for cherries, any portion of the skin of the cherry which might tend to remain unsevered between the slices will be stretched across the top of the underlying slit of said feeder assembly and completely severed by the passage of the knife edge into the slit.

ARTHUR B. McLAUCHLAN.

REFERENCES CITED

The following references are of record in the file of this patent:

UNITED STATES PATENTS

| Number | Name | Date |
|---|---|---|
| 83,829 | Burbank | Nov. 10, 1868 |
| 264,449 | Fahs | Sept. 19, 1882 |
| 433,302 | Paci | July 29, 1890 |
| 453,859 | Flickinger et al. | June 9, 1891 |
| 2,004,573 | Galley et al. | June 11, 1935 |
| 2,131,851 | Anstice | Oct. 4, 1938 |
| 2,138,262 | Urschel et al. | Nov. 29, 1938 |
| 2,349,212 | Urschel et al. | May 16, 1944 |